United States Patent [19]
Sato et al.

[11] Patent Number: 6,008,912
[45] Date of Patent: Dec. 28, 1999

[54] IMAGE PROCESSING DEVICE

[75] Inventors: Shinichi Sato, Yokohama; Kazuyuki Nishimura, Ichikawa, both of Japan

[73] Assignee: Matsushita Graphic Communication Systems, Inc., Tokyo, Japan

[21] Appl. No.: 09/086,557

[22] Filed: May 29, 1998

[30] Foreign Application Priority Data

Jun. 20, 1997 [JP] Japan ..................................... 9-180527

[51] Int. Cl.$^6$ ................................ G03F 3/08; G06K 9/00
[52] U.S. Cl. .......................... 358/518; 358/520; 382/162; 382/167
[58] Field of Search ..................................... 358/504, 505, 358/515, 518, 519, 520, 534, 535; 382/162, 167

[56] References Cited

U.S. PATENT DOCUMENTS 5,202,935   4/1993   Kanamori et al. ...................... 382/162
5,357,352   10/1994  Eschbach .............................. 358/518

*Primary Examiner*—Kimberly A. Williams
*Attorney, Agent, or Firm*—Greenblum & Bernstein, P.L.C.

[57] ABSTRACT

The invention is configured in such a manner that it has color correction means for color correcting to image data; and color correction controlling means for setting a matrix coefficient to said color correction means, said color correction controlling means calculating the optimum color correction coefficient from combination of specific variables which fulfill Conditions 1 and 2 below, and applying these optimum color correction coefficient to said matrix coefficient.

Condition 1: Achromatic color data is not changed before or after color correction Condition 2: Luminance is not changed before or after color correction.

7 Claims, 8 Drawing Sheets

IMAGE PROCESSING DEVICE

BACKGROUND OF THE INVENTION

1. Field of the Invention

The present invention relates to an image processing device which corrects color shift of its own accord.

2. Description of the Related Art

A conventional image processing device will be described with reference to FIGS. 4–6.

FIG. 4 is an overall structural diagram of a conventional image processing device. A scanning unit 41 scans a paper and converts it into electric signals, thus generating scanning data. A color correction unit 42 corrects color shift in this scanning data or data which has been received. An image processing unit 43 implements γ correction, or lightness correction, and binary processing on the data which has been corrected for color shift in this manner. A control unit 45 controls the whole process.

There follows a description of the action of a conventional image processing device of the above configuration. Colors are represented by the three primary colors R, G and B. Hardware within the image processing device processes all colors in terms of these three primary ones. Now, colors may also be expressed by means of color coordinates (*L*a*b), wherein lightness and chromaticity are separated. This means that in calculating color shift in order to determine correction coefficients, it is possible to do so by correcting only the chromaticity, and leaving the lightness uniform. However, inasmuch as the correction of color shift is applied to devices which process color in terms of R, G and B, it requires to be expressed in the R/G/B system. Thus, color differences are calculated in terms of *L*a*b coordinates, while correction coefficients are calculated in terms of R, G and B coordinates.

FIGS. 5 and 6 will be used in order to explain the flow up to the acquisition of an optimal color correction matrix. The control unit 45 converts a plurality of color pattern data (Ri, Gi, Bi) for color correction, which it holds, into the *L*a*b system of color expression, as a result of which lightness information (*Li) is acquired (S1). By 'color pattern data for color correction' here is meant color pattern data serving as a standard for use in correcting color shift, and expressed in numerical form. When output by a standard printing device, this data forms a standard color pattern. Similarly, when scanning by a standard scanning device, this data forms color pattern data for use in color correction. The correction coefficients for color shift are values which allow a particular device to approach as close as possible to these standard printing and scanning devices.

This color pattern data for use in color correction is output from the printing unit 44 (S2) to provide test pattern copy 6. In this case it is output without being processed by the color processing unit. The output color pattern is scanned by the scanning unit 41, smoothing is implemented in order to improve the precision with which the color correction is scanned, and this data becomes $(R_0\ G_0\ B_0)$ (S3).

Next, the data $(R_0\ G_0\ B_0)$ is converted temporarily into the *L*a*b system in order to obtain lightness information (*L), yielding $(*L_0*a_0*b_0)$. The lightness information $(*L_0)$ is converted into lightness information (Li) of the original color pattern data for use in color correction, thus giving $(*Li*a_0*b_0)$ (S4). In order to correct only the chromaticity, the color correction unit 42 substitutes the lightness data of the color pattern data for use in color correction for the lightness information of the data which has been scanned.

Then, the $(*Li*a_0*b_0)$ thus acquired is converted back into an RGB signal to yield $(R_{ch}\ G_{ch}\ B_{ch})$ (S5). It is necessary to calculate the correction coefficients in terms of the RGB system because that is the system in which the hardware processes the color data in terms of the RGB system. The correction coefficients are made into 3×3 matrices corresponding to the three colors R, G and B, and are represented by the following formula (1).

$$T = \begin{bmatrix} 1-a-b & a & b \\ c & 1-c-d & d \\ e & f & 1-e-f \end{bmatrix} \quad (1)$$

If the matrix to be determined is set up in accordance with formula (1), the variables may be represented by the six letters from a to f. The initial value, ranges of variation and resolution of each of these variables (i.e. the units of size of each of the variables, representing values per 0.1 or 0.01) are determined (S6). In FIG. 6, a matrix with values in place of the variables a–f according to formula (2) below is multiplied by $(R_{ch}\ G_{ch}\ B_{ch})$, and $(R_{tmp}\ G_{tmp}\ B_{tmp})$ are calculated (S7).

$$\begin{bmatrix} R_{tmp} \\ G_{tmp} \\ B_{tmp} \end{bmatrix} = \begin{bmatrix} 1-a-b & a & b \\ c & 1-c-d & d \\ e & f & 1-e-f \end{bmatrix} \begin{bmatrix} R_{ch} \\ G_{ch} \\ B_{ch} \end{bmatrix} \quad (2)$$

Once it has become the correction matrix which serves to minimize color shift, it will be seen that $(R_{ch}\ G_{ch}\ B_{ch})$ represent the pre-correction data, while $(R_{tmp}\ G_{tmp}\ B_{tmp})$ represent the data after correction. The resultant $(R_{tmp}\ G_{tmp}\ B_{tmp})$ are then converted back into *L*a*b coordinates to give $(*L_{tmp}*a_{tmp}*b_{tmp})$ (S8) The error between this data and the standard color pattern data for use in color correction (*Li*ai*bi) is calculated for each color, and the sum of these errors ΔE determined in accordance with formula (3) (S9).

$$\Delta E = [(*Li - *L_{tmp})^2 + (ai - a_{tmp})^2 + (*bi - *b_{tmp})^2]^{1/2} \quad (3)$$

This sum is calculated every time the matrix variables a–f are altered within the range of variation (S11), and by repeating steps S7–S10, S11 the total sum within the range of variation of the matrix coefficients is calculated (S10), and the variables a–f of a transformation matrix where the sum of the errors ΔE is smallest are determined. This matrix becomes the correction coefficient of both the scanning unit 41 and the printing unit 44, which is to say it becomes the color correction coefficient during the action of copying.

In the above description the color correction coefficients were calculated by means of the least square. This method requires a great deal of calculation time if the resolution is set too small. For instance, if the range of each of the variables a–f is between −2.0 and +2.0, and if the resolution is set in units of 0.01, the calculations in steps S7–S9 need to be implemented in $401^6$ ways, so that much time is expended in calculation. A method of effecting of the calculation in less time has also been proposed.

Firstly, calculations are not effected at a final resolution of 0.01, but rather each of the variables is broken down roughly (e.g. in units of 0.5). The method of the least square is then employed in order to calculate the matrix M11 where the sum of the errors ΔE is smallest, and the matrix M12 where it is second smallest (S12). Resolution is set somewhat more finely (e.g. in units of 0.2) within the range of variables a–f determined by these matrices M11 and M12 (S14). Matrices M21 and M22 where ΔE is respectively smallest and second smallest are calculated again (S7–S12). This is repeated a plurality of times (n times) until the value of each of the variables reaches its smallest resolution (e.g. 0.01), the matrix Mn1 where ΔE is smallest is calculated, and this is adopted as the color correction coefficient (S15). In this way it is possible to obtain the optimum color correction coefficient.

However, in the above conventional examples nine signals are output from the control unit 45 to the color correction unit, and therefore the process of detecting minimum differences in color needs to be executed in all combinations of the nine variables. Consequently, if the number of samples per variable is n, this process must be executed $n^9$ times. Even if the condition outlined below is applied and the number of variables limited to six as in formula (1) above, the process of detecting minimum differences in color needs to be executed $n^6$ times.

Condition 1: Achromatic color data is not changed before or after color correction From Ri=Gi=Bi=R0=G0=B0
m11+m12+m13=1
m21+m22+m23=1
m31+m32+m33=1

Thus there has been a problem in that the number of calculations involved is great, and this requires a large amount of time. There has also been the problem of lengthy processing time which resulted from the fact that the process of calculating the optimum color correction coefficient was implemented by means of software.

SUMMARY OF THE INVENTION

It is an object of the present invention, which has been devised against the background of the above problems, to provide an image processing device which permits shortening of the time required for calculating color correction coefficients.

With a view to attaining the above object, the invention described in claim 1 is configured in such a manner that it has color correction means for color correcting to image data; and color correction controlling means for setting a matrix coefficient to said color correction means, said color correction controlling means calculating the optimum color correction coefficient from combination of specific variables which fulfill Conditions 1 and 2 below, and applying these optimum color correction coefficient to said matrix coefficient.

Condition 1: Achromatic color data is not changed before or after color correction. Condition 2: Luminance is not changed before or after color correction.

This configuration permits a reduction in the number of variables when color correction coefficients are being calculated, thus allowing the time required for this calculation to be shortened.

DESCRIPTION OF THE PREFERRED EMBODIMENT

There follows a detailed description of an embodiment of the present invention with reference to the drawings.

Figure 1:
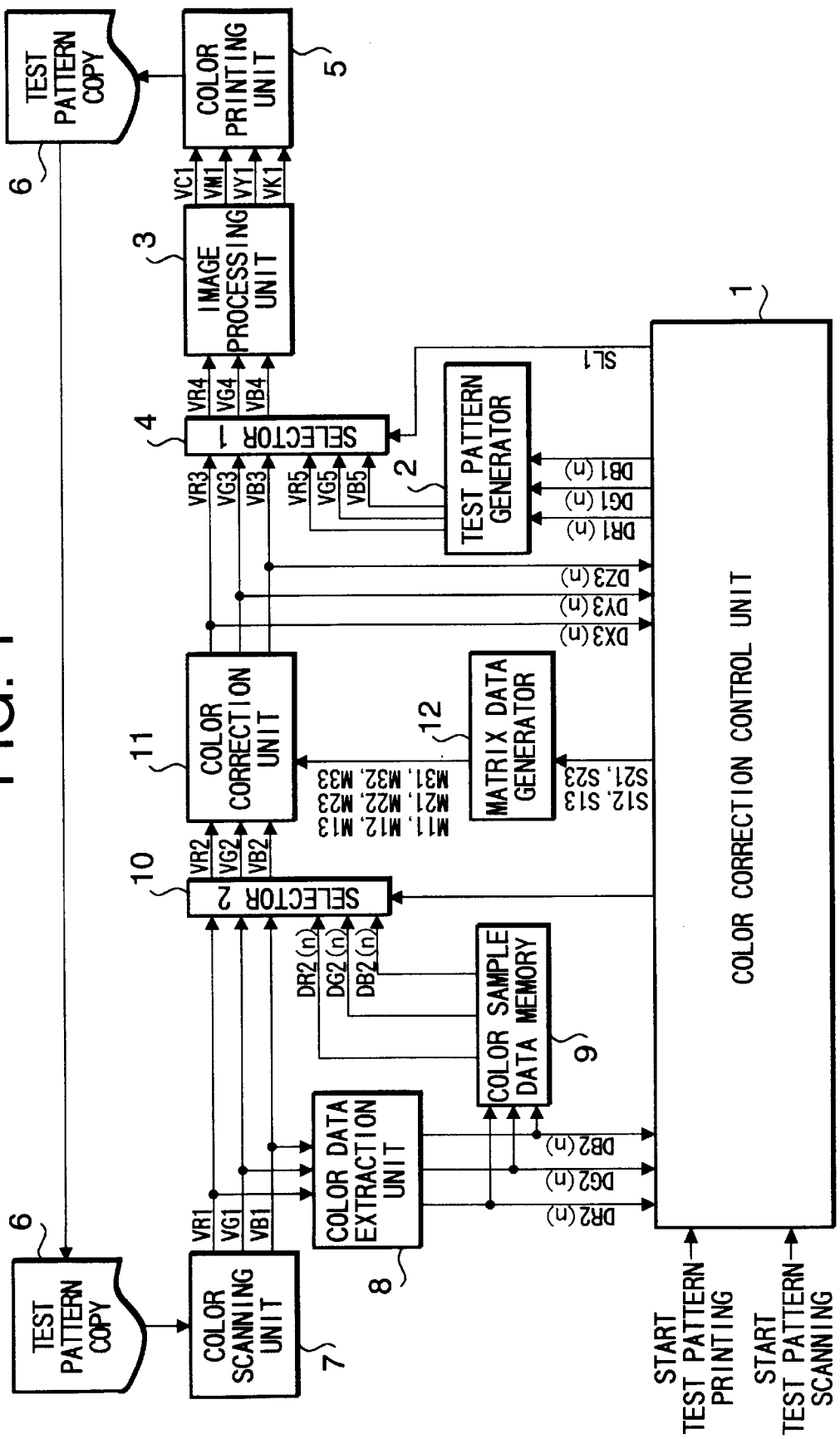
FIG. 1 is an overall structural diagram of an image processing device according to a embodiment of the present invention.
Figure 2A:
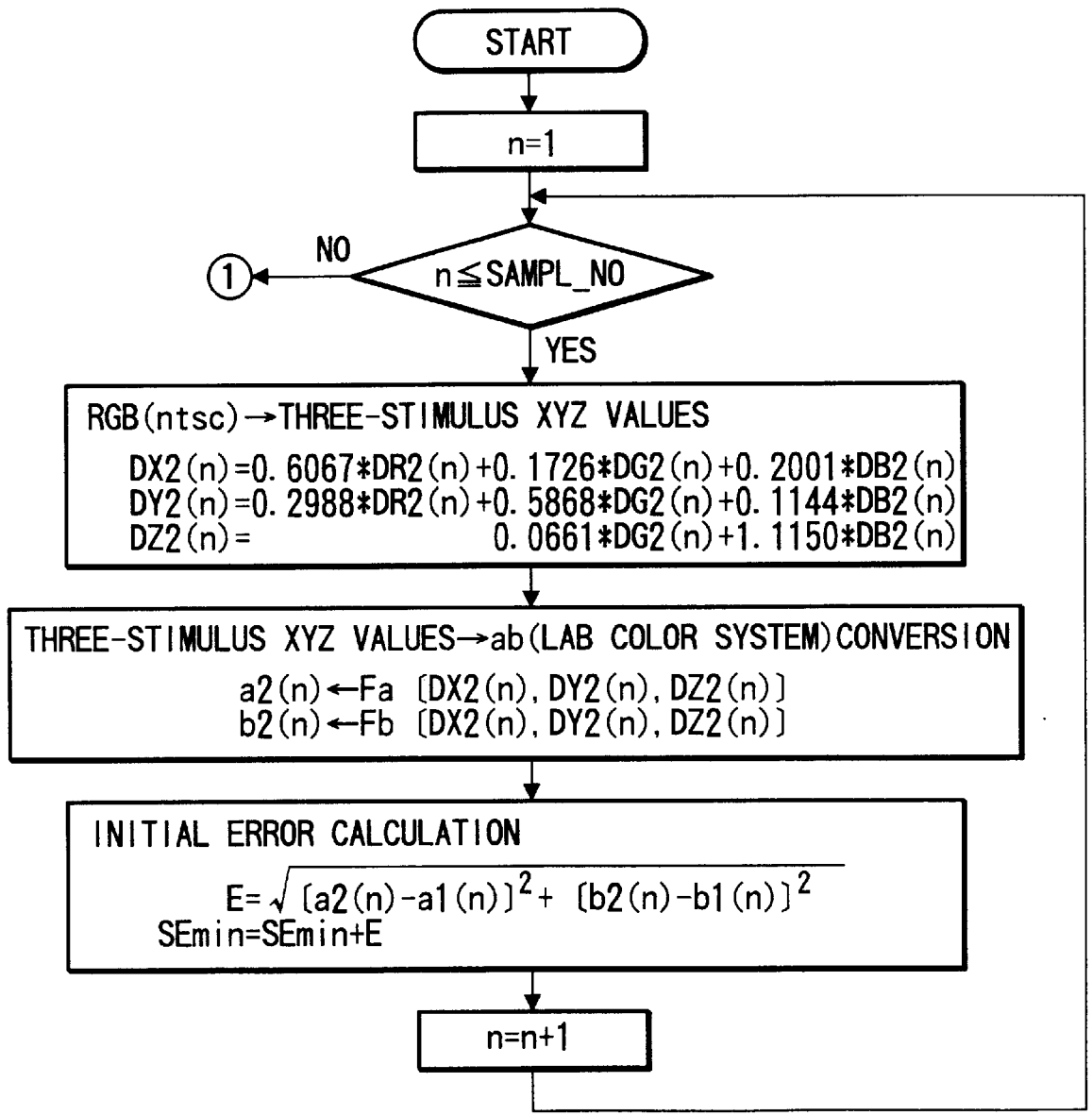
FIG. 2A and 2B are flow charts illustrating the calculation of color correction coefficients.
Figure 2B:
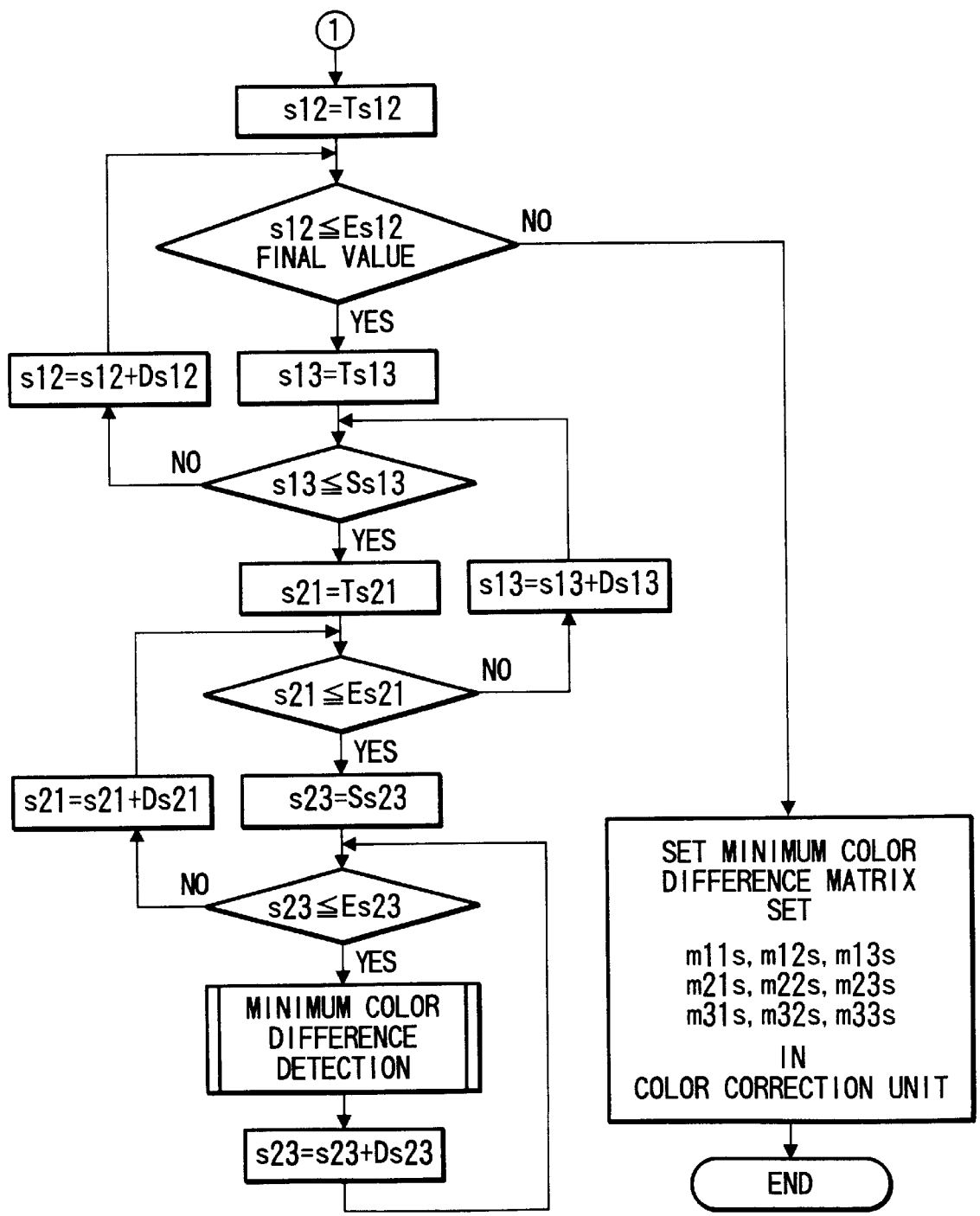
Figure 3A:
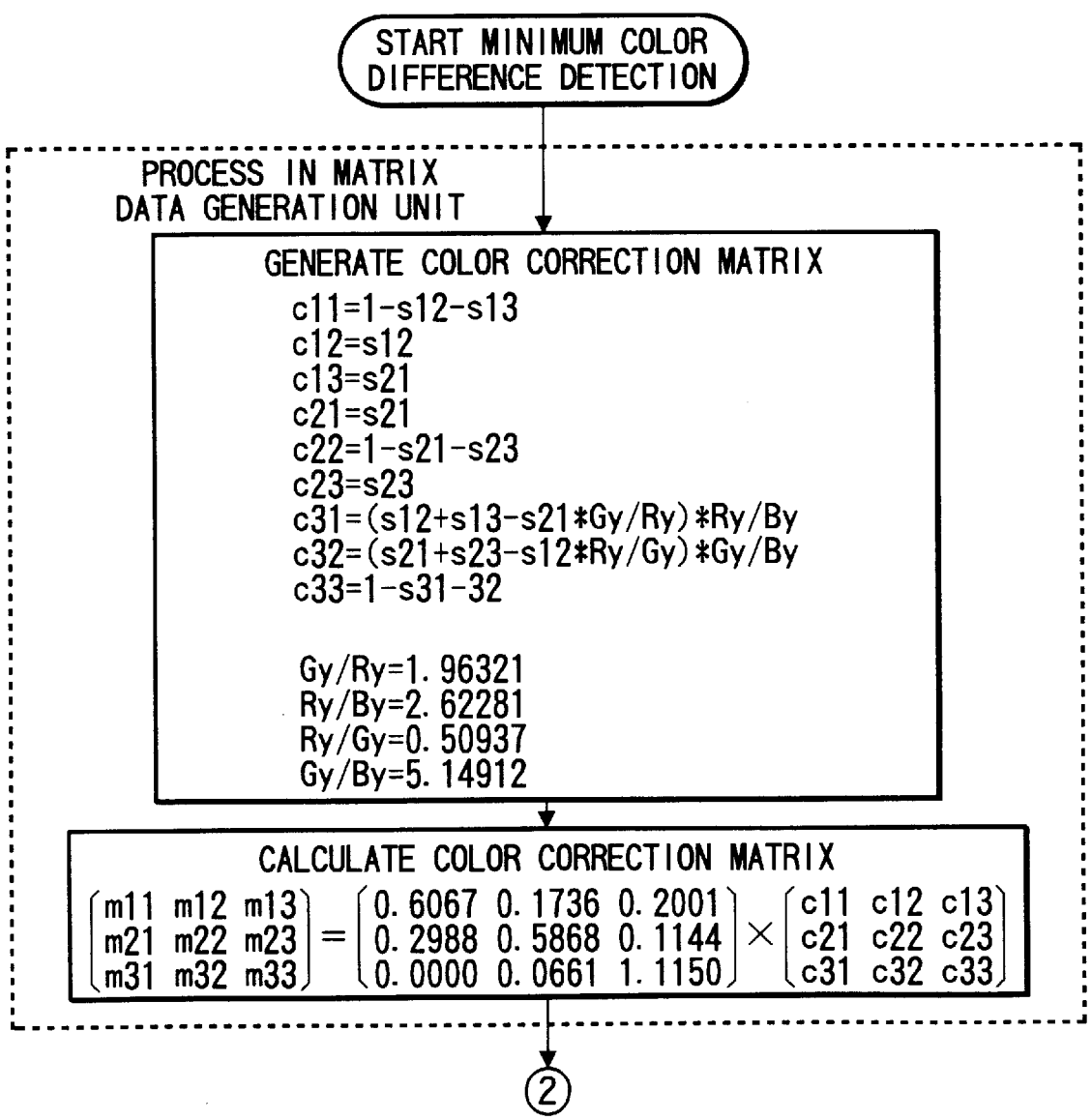
FIG. 3A and 3B are flow charts illustrating the process of detecting the minimum difference in color.
Figure 3B:
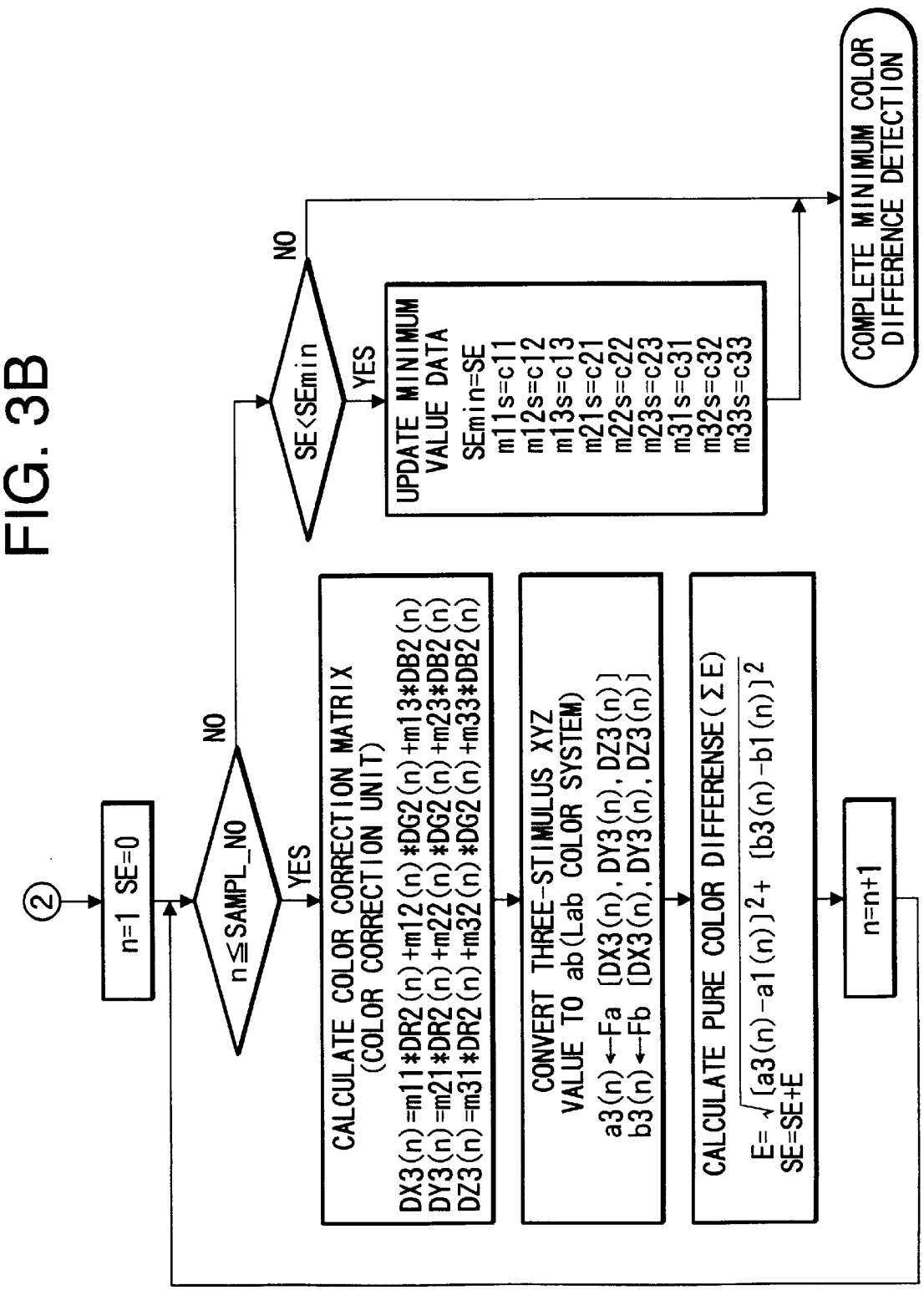
Figure 4:
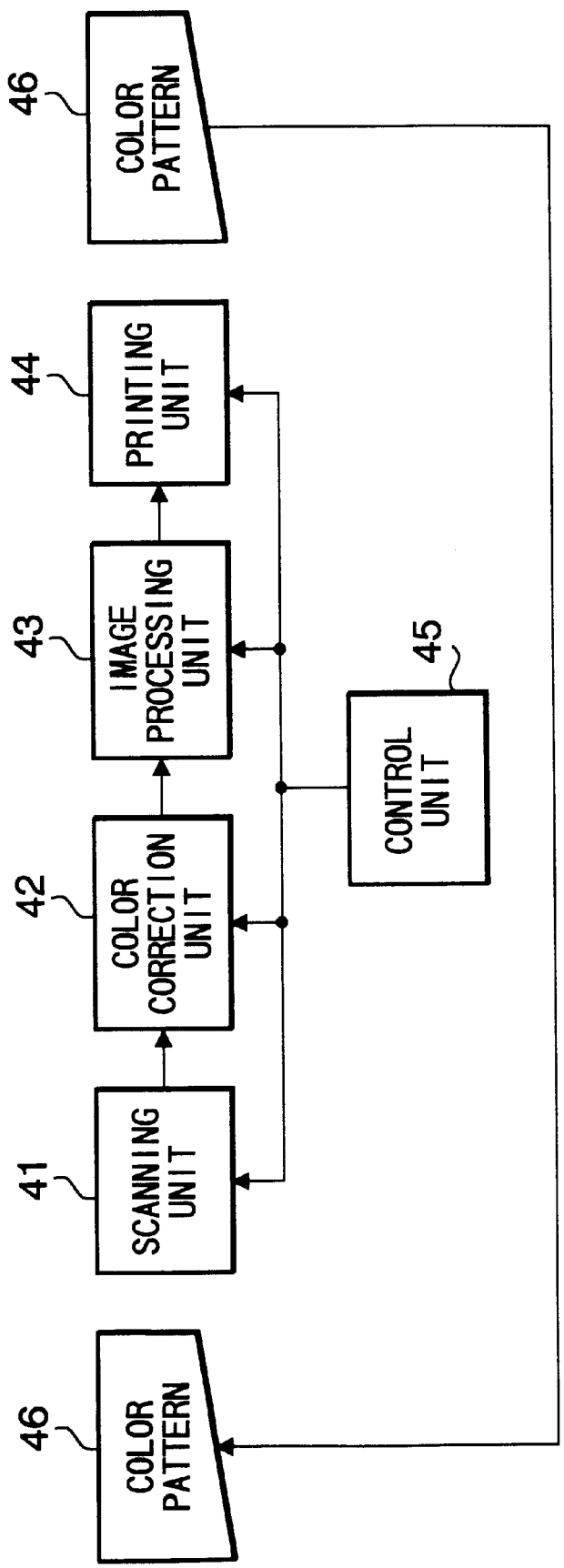
FIG. 4 is an overall structural diagram of a conventional image processing device.
Figure 5:
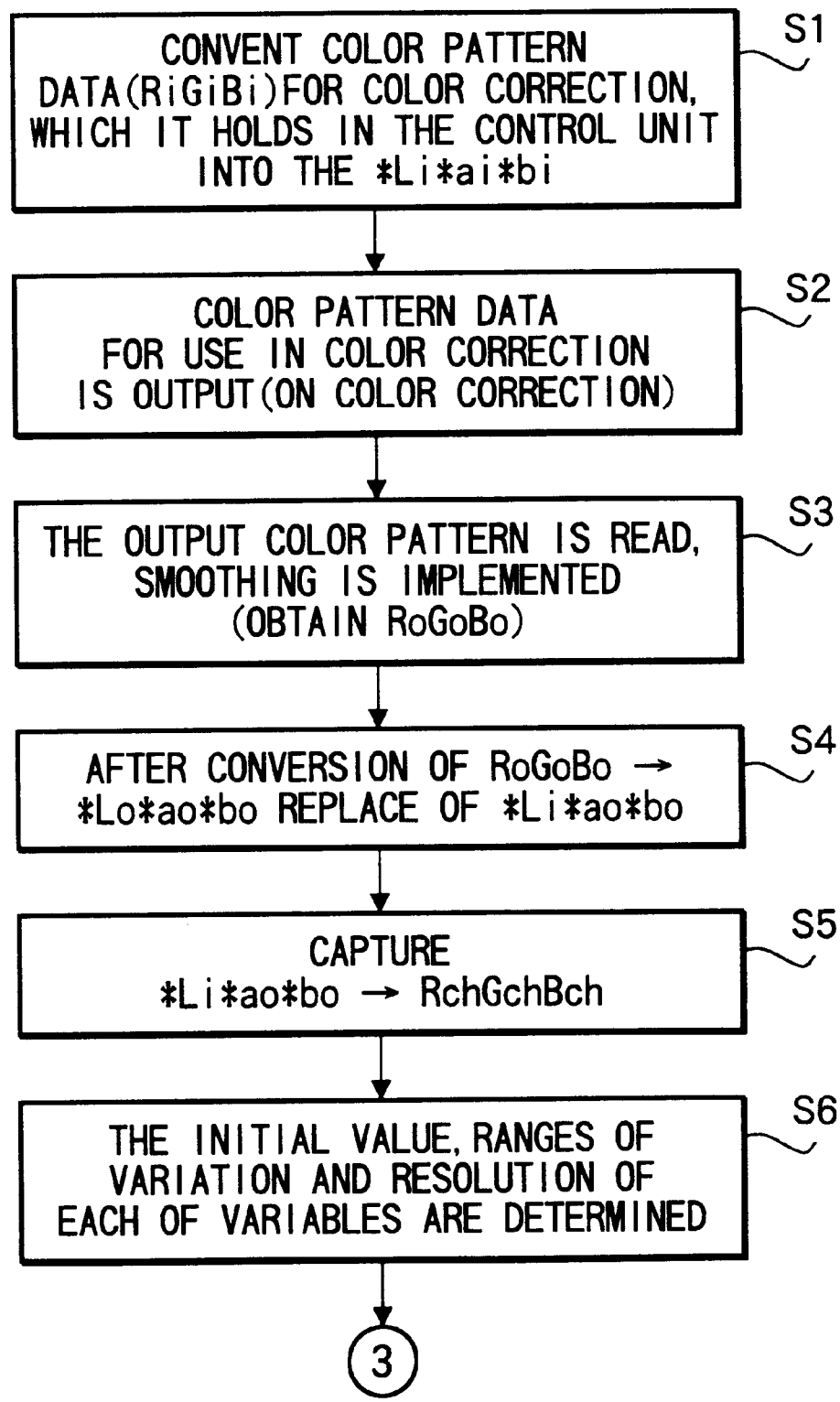
FIG. 5 is a flowchart illustrating the calculation of minimum color correction matrix coefficients.
Figure 6:
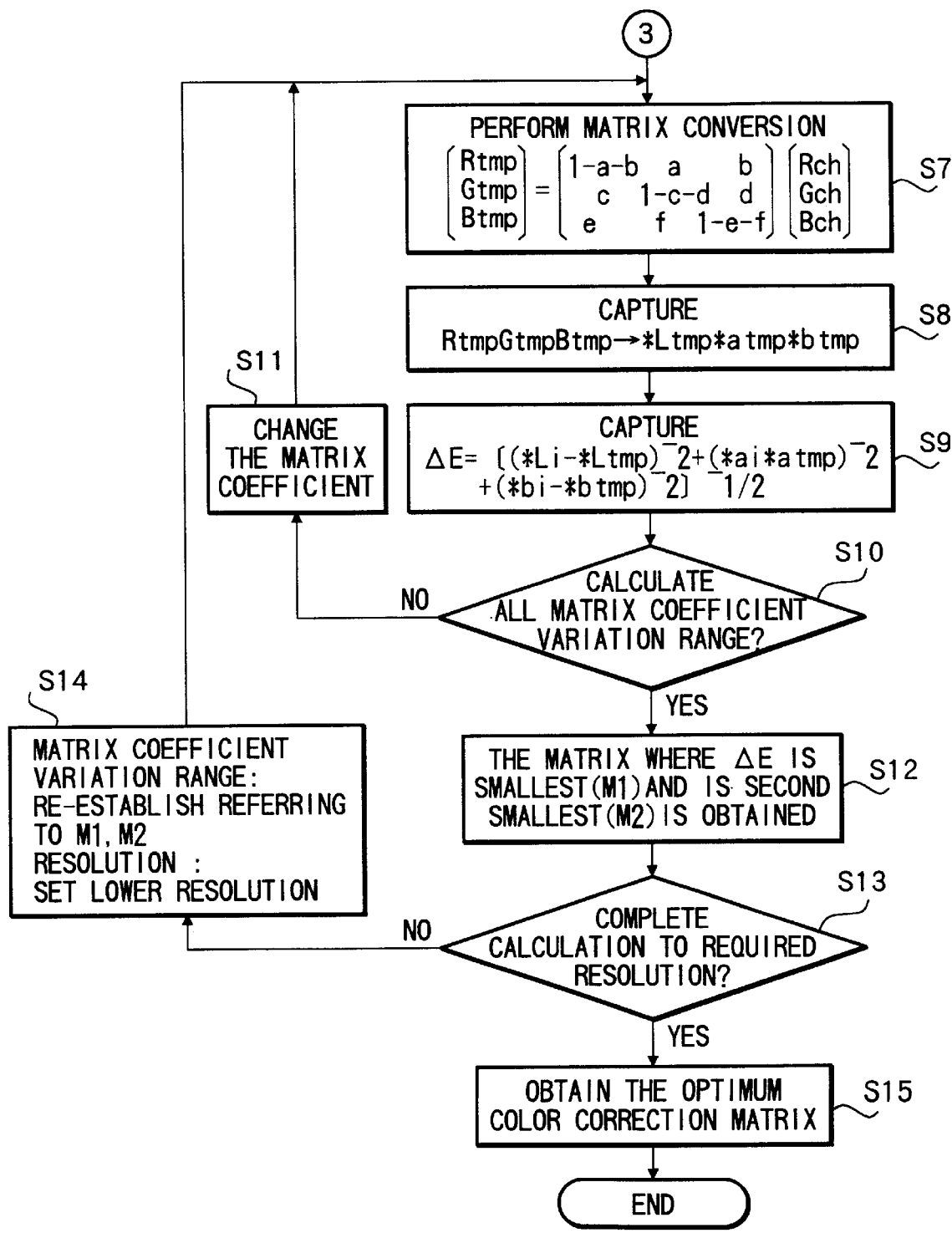
FIG. 6 is a flowchart illustrating the calculation of minimum color correction matrix coefficients.

FIGS. 1–3 will be used in order to describe this embodiment of the present invention.

In FIG. 1, a color correction control unit 1 controls the whole process of color correction and holds specific data as explained below. A test pattern generator 2 outputs test pattern image data on the basis of color sample data held by the color correction coefficient control unit 1. An image processing unit 3 converts RGB color data into CMYK data. A selector 4 selects data to be output to the image processing unit 3. A printing unit 5 prints test pattern copy 6. A scanning unit 7 scans the test pattern copy 6, converts it into electric signals and generates scanning data. A color data extraction unit 8 extracts the number of samples of color sample data from the image data. A color sample data memory 9 records the data which is extracted by the color data extraction unit 8. A selector 10 selects data which is to be output to a color correction unit 11. The color correction unit 11 executes color correction on the image signals which have been scanned, and also calculates the color correction coefficient. A matrix data generator 12 calculates nine matrix coefficients from four variables.

There now follows a description of the action of an image processing device of the above configuration to which the present invention pertains.

When a signal to begin test pattern printing is generated, test pattern print processing commences as described below.

The color correction control unit 1 controls the whole process of color correction and outputs a pre-determined number of output color sample data DR1 (n), DG1 (n), DB1 (n) (n=1~ sample number) to the test pattern generator 2. The test pattern generator 2 converts to raster data on the basis of the output color sample data DR1 (n), DG1 (n), DB1 (n) in accordance with a pre-determined test chart format, and outputs test pattern image data in synchronization with the image processing of the image processing unit 3. The selector 4 selects VR5, VG5, VB5 in response to control from the color correction control unit 1, and outputs to the image processing unit 3. The image processing unit 3 converts RGB color data VR4, VG4, VB4 into CMYK data VC1, VM1, VY1, VK1 in accordance with the input data types of the color printing unit. The printing unit 5 prints the test pattern copy 6 on the basis of this data.

Next, the process of scanning the test pattern as below commences in response to a signal to begin scanning the test pattern.

The scanning unit 7 scans the printed test pattern copy 6 pixel by pixel, resolves it into the three colors RGB, and after shading correction and white balance correction outputs the three-color RGB data in the form of VR1, VG1, VB1 data. The color data extraction unit 8 averages the number of pixels in the prescribed manner, removes noise moire, and extracts the prescribed number of samples of color sample data from the pixel data at a specific position in accordance with a pre-determined test chart format, outputting input color sample data DR2 (n), DG2 (n), DB2 (n) (n=1~ sample number). This data is recorded in the color sample data memory 9, and input into the color correction control unit 1.

When the scanning unit 7 has completed the process of scanning the test pattern, the process of calculating the optimum color correction coefficient begins.

The selector 10 selects DR2 (n), DG2 (n), DB2 (n) in response to control from the color correction control unit 1.

The color correction control unit 1 prepares in advance data a1 (n), b1 (n) (n=1~ sample number) wherein the pre-determined output color sample data DR1 (n), DG1 (n), DB1 (n) (n=1~ sample number) has been resolved into lightness and chromaticity, and subjected to ab conversion into color coordinates (Lab color system). The color correction control unit 1 converts the input color sample data DR2 (n), DG2 (n), DB2 (n) (n=1~ sample number) from RGB into the XYZ tristimulus values, and from XYZ into ab (Lab color system) as a2 (n), b2 (n) (n=1~ sample number). The difference in color (E(n)) between a2 (n) and b2 (n) is determined from a1 (n), b1 (n) by means of the following formula.

$$E(n) = \sqrt{(a2(n)-a1(n))^2 + (b2(n)-b1(n))^2} \qquad (4)$$

The sum of the difference in color for all the samples is determined, and this is taken as the minimum value for the difference in color ($SE_{min}$).

$$SE_{min} = \sum_{n=1}^{SAMPLE\_NO} E(n) \qquad (5)$$

Minimum values (TS12, TS13, TS21, TS23) and maximum values (ES12, ES13, ES21, ES23) for the four matrix variables (S12, S13, S21, S23) are set, as are the calculation step intervals (DS12, DS13, DS21, DS23). The four matrix variables are in the range minimum value ≦ matrix variables ≦ maximum value, and take the discrete values of the calculation step intervals. The process of detecting the minimum difference in color is executed in relation to combinations of all four variables which fulfill this condition. As a result of this process, the minimum matrix coefficients for differences in color (M11, M12, M13, M21, M22, M23, M31, M32, M33) are set as color correction coefficients in the color correction unit 11.

Next, the relational expression for determining the nine matrices from the above four variables will be described.

The formula for calculating the color correction matrices is as follows.

$$\begin{bmatrix} R_0 \\ G_0 \\ B_0 \end{bmatrix} = \begin{bmatrix} m11 & m12 & m13 \\ m21 & m22 & m23 \\ m31 & m32 & m33 \end{bmatrix} \begin{bmatrix} R_i \\ G_i \\ B_i \end{bmatrix} \qquad (6)$$

Condition 1: Achromatic color data is not changed before or after color correction.

From $Ri=Gi=Bi=R_0=G_0=B_0$ $$m11+m12+m13=1 \qquad ①$$

$$m21+m22+m23=1 \qquad ②$$

$$m31+m32+m33=1 \qquad ③$$

Condition 2: Luminance is not changed before or after color correction.

This is defined in the Lab color system in terms of the XYZ tristimulus values, and L is defined by the following formula.

$$L = 166(Y/Y_n)^{1/3} - 16$$

$$Y_n = 100 \qquad (7)$$

In order for the luminance (L) to be uniform between input and output of color correction, it is sufficient that Y (XYZ tristimulus values) be uniform between input and output.

Thus, if

| Color correction input: | $R_i, G_i,$ | Input Y stimulus value: |
| --- | --- | --- |
| | $B_i$ | $Y_i$ |
| Color correction output: | $R_0, G_0,$ | Output Y stimulus value: |
| | $B_0$ | $Y_0$ | conversion of RGB from Ri, Gi, Bi to Yi in the case of NTSC television standard RGB is:

$$Y_i = R_i * Ry + G_i * Gy + B_i * By \qquad ④$$

$$Ry = 0.2988 \; Gy = 0.5868 \; By = 0.1144$$

In the same manner, conversion from $R_0, G_0, B_0$, to $Y_0$ is:

$$Y_0 = R_0 * Ry + G_0 * Gy + B_0 * By$$

Substituting relational expressions for color correction matrix calculation in the above formula:

$$Y_0 = (m11*Ry+m21*Gy+m31*By)*Ri + (m12*Ry+m22*Gy+m32*By)*Gi + (m13*Ry+m23*Gy+m33*By)*Bi \qquad ⑤$$

In formulae ④ and ⑤, where $Y_0 = Y_i$:

$$m11*Ry+m21*Gy+m31*By=Ry \qquad ⑥$$

$$m12*Ry+m22*Gy+m32*By=Gy \qquad ⑦$$

$$m13*Ry+m23*Gy+m33*By=By \qquad ⑧$$

The relational expressions ①②③ of Condition 1 above show the conditions for the matrix coefficients row, while the relational expressions ⑥⑦⑧ of Condition 2 show them column.

Consequently, any combination of the relational expressions ①②③⑥⑦⑧ is redundant, and if four of the nine matrix coefficients are determined, the remaining five follow automatically.

For instance, if the independent-variables are m12, m13, m21, m23:

from formula ①, m11=1−m12−m13 from formula ②, m22=1−m21−m23 from formula ⑥, m31=(1−m11−m12*Gy/Ry)*Ry/By=(m12+m13−m21*Gy/Ry)*Ry/By where Gy/Ry=1.96321 Ry/By=2.62281 from formula ⑦, m32=(1−m12*Ry/Gy −m22)*Gy/By where Ry/Gy=0.50937 Gy/By=5.14912 from formula ③, m33=1−m31−m32.

The above are relational expressions of the type used in the present embodiment, and it is clear that from the relational expressions ①②③⑥⑦⑧ it is possible to derive similar relational expressions for the desired four coefficients.

There now follows a description of the process of detecting minimum differences in color.

The color correction control unit 1 outputs to the matrix data generator 12 the variable values (S12, S13, S21, S23) corresponding to one combination of four matrix variables. The matrix data generator 12 calculates from these four variables the nine matrix coefficients (C11, C12, C13, C21, C22, C23, C31, C32, C33) in accordance with the relational expressions below.

c11=1−s12−s13
c12=s12
c13=s13
c21=s21
c22=1−s21−s23
c23=s23
c31=(s12+s13−s21*Gy/Ry) *Ry/By
c32=(s21+s23−s12*Ry/Gy) *Gy/By
c33=1−s31−s32
Gy/Ry=1.96321
Ry/By=2.62281
Ry/Gy=0.50937
Gy/By=5.14912

Next, the matrix converting the RGB of ntsc into three-stimulus XYZ values and the matrix obtained from the above relational expressions are multiplied to determine the matrix values (M11, M12, M13, M21, M22, M23, M31, M32, M33) to be set in the color correction unit, and this is set in the color correction unit 11.

Then, the recorded color sample data DR2 (n), DG2 (n), DB2 (n) (n=1~ sample number) is scanned from the color sample data memory 9, matrix calculation is executed in the color correction unit 11 on the basis of the above matrix values for setting color correction, and the three-stimulus XYZ data DX3 (n), DY3 (n), DZ3 (n) (n=1~ sample number) is output.

The color correction control unit 1 converts the three-stimulus XYZ data DX3 (n), DY3 (n), DZ3 (n) (n=1~ sample number) from three-stimulus XYZ values into ab (Lab color system) as a3 (n), b3 (n) (n=1~ sample number).

The difference in color is determined from this a3 (n), b3 (n) and a1 (n), b1 (n) above by means of the following formula.

$$E(n) = \sqrt{(a3(n) - a1(n))^2 + (b3(n) - b1(n))^2} \quad (8)$$

The sum of the difference in color for all the samples is determined and taken as the total value for the difference in color.

$$SE = \sum_{n=1}^{SAMPLE\_NO} E(n) \quad (9)$$

The minimum total value for difference in color ($SE_{min}$) and the total value for difference in color (SE) are compared, and if the total value is small, the data for the minimum total value for difference in color ($SE_{min}$) and the minimum matrix coefficients for difference in color (M11S, M12S, M13S, M21S, M22S, M23S, M31S, M32S, M33S) are renewed.

Next, after the process of calculating the optimum color difference correction, copy not illustrated in the drawings is set, and the process of scanning and printing the copy is implemented as below in response to a signal to commence color copying.

The minimum matrix coefficients for difference in color (M11S, M12S, M13S, M21S, M22S, M23S, M31S, M32S, M33S) are set in the color correction unit 11 as color correction coefficients.

The selector 10 selects VR1, VG1, VB1, and the selector 4 selects VR3, VG3, VB3. The scanning unit 7 resolves the copy into the three colors RGB, scans it pixel by pixel, and after shading correction and white balance correction outputs the three-color RGB data. The color correction unit 11 corrects the color in accordance with the minimum matrix coefficients for difference in color (M11S, M12S, M13S, M21S, M22S, M23S, M31S, M32S, M33S). In the image processing unit 3, the three-color RGB data is converted to CMYK data in accordance with the input data type of the printing unit 5, and the printing unit 5 executes color printing on the basis of this data.

Conventionally there have been nine signals (M11–M33) output from the color correction control unit 1 to the color correction unit 11, and this has meant that it is necessary to implement the process of detecting the minimum difference in color for all the combinations of the nine variables. Thus, if the number of samples per variable is represented as n, it has been necessary to implement the process of detecting the minimum difference in color $n^9$ times. Even if the Condition 1 outlined above was applied and the number of variables limited to six, the process of detecting minimum differences in color needed to be executed $n^6$ times.

By adding Condition 2 and limiting the number of variables to four (s12, s13, s21, s23), the present invention makes it possible to determine the optimum color correction coefficients by detecting the minimum difference in color $n^4$ times. By eliminating two variables it allows the number of calculations to be reduced to $1/n^2$. This permits of a considerable shortening of calculation time.

Moreover, there has hitherto been a problem in that processing time was long because the optimum color correction coefficients were calculated with the aid of software in the color correction control unit on the basis of data (DB2 (n), DG2 (n), DR2 (n)) which was input from the color data extraction unit. In the present invention, the matrix calculation function of the color correction unit (hardware) is utilized during the process of calculating the optimum color correction coefficients, enabling processing to be executed at high speed from the calculation of the color sample data (DB2 (n), DG2 (n), DR2 (n)) to the conversion to three-stimulus XYZ values with the aid of hardware. If the color correction unit 11, which has the greatest number of hardware circuits, is used in dual mode while scanning the copy and calculating the optimum color correction coefficients, this high-speed operation is feasible with a slight increase in hardware.

What is claimed is:

1. An image processing device comprising:
   color correction means for color correcting to image data; and
   color correction controlling means for setting a matrix coefficient to said color correction means, said color correction controlling means calculating the optimum color correction coefficient from combination of specific variables which fulfill Conditions 1 and 2 below, and applying these optimum color correction coefficient to said matrix coefficient.
   Condition 1: Achromatic color data is not changed before or after color correction
   Condition 2: Luminance is not changed before or after color correction.

2. The image processing device according to claim 1, wherein the number of the specific variable is four and the matrix coefficient has nine matrix coefficients of three rows and three columns.

3. The image processing device according to claim 2, wherein color sampling data is fed to the color correction means, the difference in color between a color data determined from three-stimulus XYZ values obtained by calculating the matrices in the color correction means and said color sampling data is calculated, the minimum difference in color is detected from all the differences in color corresponding to all the combinations of the specific variables, and the combination of variables with the minimum difference in color is converted into optimum color correction coefficient.

4. The image processing device according to claim 1, wherein color sampling data is fed to the color correction means, the difference in color between a color data determined from three-stimulus XYZ values obtained by calculating the matrices in the color correction means and said color sampling data is calculated, the minimum difference in color is detected from all the differences in color corresponding to all the combinations of the specific variables, and the combination of variables with the minimum difference in color is converted into a color correction coefficient.

5. The image processing device according to claim 1, wherein the matrix coefficient where the difference in color is smallest is calculated by a first resolution, and the matrix coefficient where the difference in color is smallest is calculated by a second resolution which is finer than the first resolution.

6. An image processing device comprising:
   color correction means for color correcting image data, which is input by scanning means, by using a matrix coefficient;
   a test pattern generator which generates pattern data for use in color correction; and
   color correction controlling means for determining a specific variable by using the difference in color between sample data containing color shifts from actually scan test pattern and said test patterns, to set said matrix coefficient by using the specific variable, said means color correction controlling means calculating the optimum color correction coefficients from specific combination of variables which fulfill Conditions 1 and 2 below, and applying these optimum color correction coefficients to said matrix coefficients Condition 1: Achromatic color data is not changed before or after color correction Condition 2: Luminance is not changed before or after color correction.

7. An image processing method comprising the steps of:
   color correcting to image data;
   generating a matrix coefficient;
   calculating an optimum color correction coefficient from combination of specific variables which fulfill Conditions 1 and 2 below; and
   applying these optimum color correction coefficient to said matrix coefficient Condition 1: Achromatic color data is not changed before or after color correction Condition 2: Luminance is not changed before or after color correction.

* * * * *